United States Patent
Barnes et al.

(10) Patent No.: US 11,624,626 B2
(45) Date of Patent: Apr. 11, 2023

(54) METHOD, APPARATUS AND COMPUTER PROGRAM PRODUCT FOR USING A LOCATION GRAPH TO ENABLE NATURAL GUIDANCE

(71) Applicant: HERE Global B.V., Eindhoven (NL)

(72) Inventors: Craig Barnes, Forest Park, IL (US); Umesh Chandra, Lexington, MA (US); Geoff Meek, Providence, RI (US)

(73) Assignee: HERE GLOBAL B.V., Eindhoven (NL)

( * ) Notice: Subject to any disclaimer, the term of this patent is extended or adjusted under 35 U.S.C. 154(b) by 729 days.

(21) Appl. No.: 16/523,217

(22) Filed: Jul. 26, 2019

(65) Prior Publication Data
US 2021/0025727 A1     Jan. 28, 2021

(51) Int. Cl.
*G01C 21/36* (2006.01)
*G06T 7/73* (2017.01)
(Continued)

(52) U.S. Cl.
CPC ..... *G01C 21/3629* (2013.01); *G01C 21/3476* (2013.01); *G01C 21/3644* (2013.01);
(Continued)

(58) Field of Classification Search
CPC ............ G01C 21/3629; G01C 21/3476; G01C 21/3644; G06T 7/73; G06T 19/006;
(Continued)

(56) References Cited

U.S. PATENT DOCUMENTS

| | | | | |
|---|---|---|---|---|
| 7,103,854 B2 * | 9/2006 | Fuchs | ................... | G09B 29/10 |
| | | | | 715/781 |
| 7,458,037 B2 * | 11/2008 | Fuchs | ................... | G01C 21/36 |
| | | | | 715/781 |

(Continued)

FOREIGN PATENT DOCUMENTS

| | | | | |
|---|---|---|---|---|
| WO | WO-2013/060925 A1 | | 5/2013 | |
| WO | WO-2013060925 A1 * | | 5/2013 | ......... G01C 21/3644 |

OTHER PUBLICATIONS

Extended European Search Report for EP Application No. 20184914 dated Jan. 22, 2021 (9 pages).

(Continued)

*Primary Examiner* — Luis A Martinez Borrero
(74) *Attorney, Agent, or Firm* — Alston & Bird LLP

(57) ABSTRACT

A method, apparatus, and computer program product are therefore provided for providing natural guidance using one or more location graphs based on a context of a user. Methods may include: receiving an indication of a location of a user; identifying a location graph of location objects proximate the location of the user; establishing a context of the user; establishing a path among the location objects of the location graph based, at least in part, on the context of the user; generating natural language guidance based on the path among the location objects; and providing natural language guidance to the user. The location of a user may include a location along a route between an origin and a destination, where identifying a location graph of location objects may include identifying a location graph of location objects proximate the route between the origin and the destination.

20 Claims, 8 Drawing Sheets

(51) Int. Cl.
*H04W 4/024* (2018.01)
*H04W 4/029* (2018.01)
*G06F 40/56* (2020.01)
*G01C 21/34* (2006.01)
*G06T 19/00* (2011.01)
*H04W 4/021* (2018.01)
*G06V 20/20* (2022.01)

(52) U.S. Cl.
CPC ............... *G06F 40/56* (2020.01); *G06T 7/73* (2017.01); *G06T 19/006* (2013.01); *G06V 20/20* (2022.01); *H04W 4/021* (2013.01); *H04W 4/024* (2018.02); *H04W 4/029* (2018.02)

(58) Field of Classification Search
CPC ..... H04W 4/024; H04W 4/029; H04W 4/021; G06F 40/56
See application file for complete search history.

(56) References Cited

U.S. PATENT DOCUMENTS

| | | | |
|---|---|---|---|
| 8,174,568 B2* | 5/2012 | Samarasekera | G06K 9/6215 701/28 |
| 8,954,374 B2 | 2/2015 | Chakraborty et al. | |
| 9,195,290 B2* | 11/2015 | Siliski | G06F 16/444 |
| 9,390,087 B1* | 7/2016 | Roux | G06F 40/56 |
| 10,209,081 B2* | 2/2019 | Ghadiok | G06V 20/582 |
| 10,642,272 B1* | 5/2020 | Parodi | G05D 1/101 |
| 10,809,081 B1* | 10/2020 | Kentley-Klay | G08G 1/202 |
| 10,824,310 B2* | 11/2020 | Acharya | G06F 3/167 |
| 10,837,788 B1* | 11/2020 | Kentley-Klay | G01C 21/3438 |
| 11,397,462 B2* | 7/2022 | Eledath | G06F 3/011 |
| 2004/0001114 A1* | 1/2004 | Fuchs | G01C 21/36 715/855 |
| 2007/0038962 A1* | 2/2007 | Fuchs | G01C 21/36 701/538 |
| 2008/0167814 A1* | 7/2008 | Samarasekera | G06V 10/42 701/469 |
| 2008/0235631 A1* | 9/2008 | Fuchs | G01C 21/36 715/853 |
| 2008/0244459 A1* | 10/2008 | Fuchs | G01C 21/36 715/855 |
| 2010/0103196 A1* | 4/2010 | Kumar | G06F 3/012 345/633 |
| 2011/0054772 A1* | 3/2011 | Rossio | G01C 21/3644 701/532 |
| 2011/0179027 A1 | 7/2011 | Das et al. | |
| 2013/0170697 A1* | 7/2013 | Zises | G06T 3/40 382/103 |
| 2014/0310595 A1* | 10/2014 | Acharya | G06F 3/011 715/706 |
| 2016/0003636 A1* | 1/2016 | Ng-Thow-Hing | G06V 20/588 701/418 |
| 2016/0299929 A1 | 10/2016 | Park et al. | |
| 2016/0378861 A1* | 12/2016 | Eledath | G06V 20/52 707/766 |
| 2019/0187703 A1* | 6/2019 | Millard | G05D 1/0214 |
| 2019/0206258 A1* | 7/2019 | Chang | G06T 19/006 |
| 2019/0212158 A1* | 7/2019 | Gordon | G01C 21/3415 |
| 2020/0151916 A1* | 5/2020 | Kenney | G06T 11/00 |
| 2020/0294472 A1* | 9/2020 | Jones | G02B 27/0172 |
| 2021/0374836 A1* | 12/2021 | Bronicki | G06Q 30/0643 |
| 2022/0365532 A1* | 11/2022 | Millard | G06V 20/10 |

OTHER PUBLICATIONS

Chen, II et al., *A Graph Database Model for Knowledge Extracted From Place Descriptions*, ISPRS Int J. Geo-Inf. 7, 221 (2018) 30 page.
Skoumas, G. et al., *Knowledge-Enriched Route Computation*, [online] [retrieved Sep. 18, 2019]. Retrieved from the Internet: http://www.dieter.pfoser.org/publicaitons/skoumas_sstd_15a.pdf. (dated Aug. 13, 2015) 18 pages.
Stirbu et al., *The Location Graph: Towards A Symbolic Location Architecture for the Web*. LocWeb 2010 (Nov. 29, 2010), 8 pages.

* cited by examiner

METHOD, APPARATUS AND COMPUTER PROGRAM PRODUCT FOR USING A LOCATION GRAPH TO ENABLE NATURAL GUIDANCE

TECHNOLOGICAL FIELD

An example embodiment of the present invention relates generally to providing natural guidance, and more particularly, to using location graphs to enable natural guidance with greater detail and accuracy than previously available.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Navigation systems that provide route guidance including dynamic route planning have conventionally established a route from an origin to a destination, and possibly waypoints. Navigation systems and mapping services can provide spoken instructions and may be able to receive spoken instructions or requests, such as for establishing an origin and a destination. However, such navigation systems have limitations with respect to the accuracy, granularity, and relevance of guidance and instructions.

BRIEF SUMMARY

A method, apparatus, and computer program product are therefore provided for providing natural guidance, and more particularly, to using location graphs to enable natural guidance with greater detail and accuracy than previously available. According to an example embodiment, an apparatus is provided including at least one processor and at least one non-transitory memory including computer program code instructions. The computer program code instructions are configured to, when executed, cause the apparatus to at least: receive an indication of a location of a user; identify a location graph of location objects proximate the location of the user; establish a context of the user; establish a path among the location objects of the location graph based, at least in part, on the context of the user; generate natural language guidance based on the path among the location objects; and provide natural language guidance to the user. The location of a user may include a route between an origin and a destination, where causing the apparatus to identify a location graph of location objects may include causing the apparatus to identify a location graph of location objects proximate the route between the origin and the destination.

Causing the apparatus of some embodiments to identify a location graph of location objects proximate the route between the origin and the destination may include causing the apparatus to identify a location graph of location objects within a predefined distance of the route, and within a predefined degree of separation on the location graph of location objects within the predefined distance of the route. The location graph of location objects may include location object nodes of objects including a physical location and semantic relationships among the location object nodes of the location graph.

According to some embodiments, causing the apparatus to establish a path among the location objects of the location graph may include causing the apparatus to: identify location object nodes relevant to the context of the user; analyze the semantic relationships among the location object nodes of the location graph; identify semantic relationships among the location object nodes relevant to the context of the user; and establish a path of relationships relevant to the context of the user among the location object nodes relevant to the context of the user. The apparatus of example embodiments may be caused to infer additional location object nodes based on the identified location object nodes based on a type of location object node. The apparatus may be caused to generate visual cues based on the path among the location objects; and provide for augmented reality of an environment of the location of the user including the visual cues.

Embodiments of the present disclosure may include a computer program product having at least one non-transitory computer-readable storage medium having computer-executable program code instructions stored therein, the computer-executable program code instructions including program code instructions to: receive an indication of a location of a user; identify a location graph of location objects proximate the location of the user; establish a context of the user; establish a path among the location objects of the location graph based, at least in part, on the context of the user; generate natural language guidance based on the path among the location objects; and provide natural language guidance to the user. The location of a user may include a location along a route between an origin and a destination, where the program code instructions to identify a location graph of location objects may include program code instructions to identify a location graph of location objects proximate the route between the origin and the destination.

The program code instructions of some example embodiments to identify a location graph of location objects proximate the route between the origin and the destination may include program code instructions to identify a location graph of location objects within a predefined distance of the route, and within a predefined degree of separation on the location graph of location objects within the predefined distance of the route. The location graph of location objects may include location object nodes of objects including a physical location and semantic relationships among the location object nodes of the location graph.

According to some embodiments, the program code instructions to establish a path among the location objects of the location graph may include program code instructions to: identify location object nodes relevant to the context of the user; analyze the semantic relationships among the location object nodes of the location graph; identify semantic relationships among the location object nodes relevant to the context of the user; and establish a path of relationships relevant to the context of the user among the location object nodes relevant to the context of the user. Embodiments may include program code instructions to infer additional location object nodes based on a type of location object node. Embodiments may include program code instructions to: generate visual cues based on the path among the location objects; and provide for augmented reality of an environment of the location of the user including the visual cues.

Embodiments provided herein may include methods, where a method may include: receiving an indication of a location of a user; identifying a location graph of location objects proximate the location of the user; establishing a context of the user; establishing a path among the location objects of the location graph based, at least in part, on the context of the user; generating natural language guidance based on the path among the location objects; and providing natural language guidance to the user. The location of a user may include a location along a route between an origin and a destination, where identifying a location graph of location objects may include identifying a location graph of location objects proximate the route between the origin and the destination.

According to some embodiments, identifying a location graph of location objects proximate the route between the origin and the destination may include identifying a location graph of location objects within a predefined distance of the route, and within a predefined degree of separation on the location graph of location objects within the predefined distance of the route. The location graph of location objects may include location object nodes of objects including a physical location and semantic relationships among the location object nodes of the location graph.

Establishing a path among the location objects of the location graph may, according to some methods, include: identifying location object nodes relevant to the context of the user; analyzing the semantic relationships among the location object nodes of the location graph; identifying semantic relationships among the location object nodes relevant to the context of the user; and establishing a path of relationships relevant to the context of the user among the location object nodes relevant to the context of the user. Methods may include: generating visual cues based on the path among the location objects; and providing for augmented reality of an environment of the location of the user including the visual cues.

Embodiments provided herein may include an apparatus, where an example apparatus may include: means for receiving an indication of a location of a user; means for identifying a location graph of location objects proximate the location of the user; means for establishing a context of the user; means for establishing a path among the location objects of the location graph based, at least in part, on the context of the user; means for generating natural language guidance based on the path among the location objects; and means for providing natural language guidance to the user. The location of a user may include a location along a route between an origin and a destination, where the means for identifying a location graph of location objects may include means for identifying a location graph of location objects proximate the route between the origin and the destination.

According to some embodiments, the means for identifying a location graph of location objects proximate the route between the origin and the destination may include means for identifying a location graph of location objects within a predefined distance of the route, and within a predefined degree of separation on the location graph of location objects within the predefined distance of the route. The location graph of location objects may include location object nodes of objects including a physical location and semantic relationships among the location object nodes of the location graph.

The means for establishing a path among the location objects of the location graph may, according to some methods, include: means for identifying location object nodes relevant to the context of the user; means for analyzing the semantic relationships among the location object nodes of the location graph; means for identifying semantic relationships among the location object nodes relevant to the context of the user; and means for establishing a path of relationships relevant to the context of the user among the location object nodes relevant to the context of the user. Some embodiments of the apparatus may include: means for generating visual cues based on the path among the location objects; and means for providing for augmented reality of an environment of the location of the user including the visual cues.

BRIEF DESCRIPTION OF THE DRAWINGS

Figure 1:
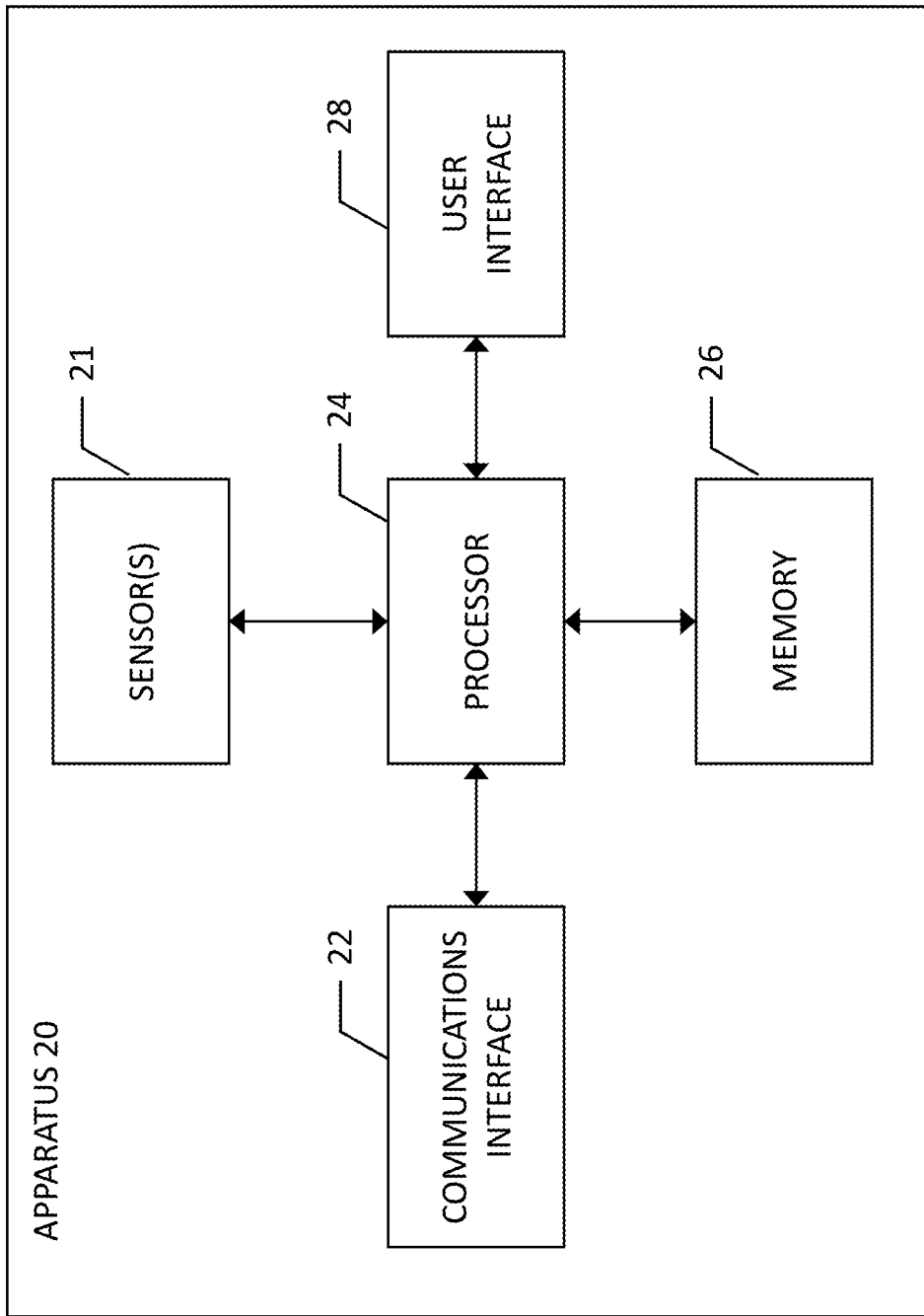
Figure 2:
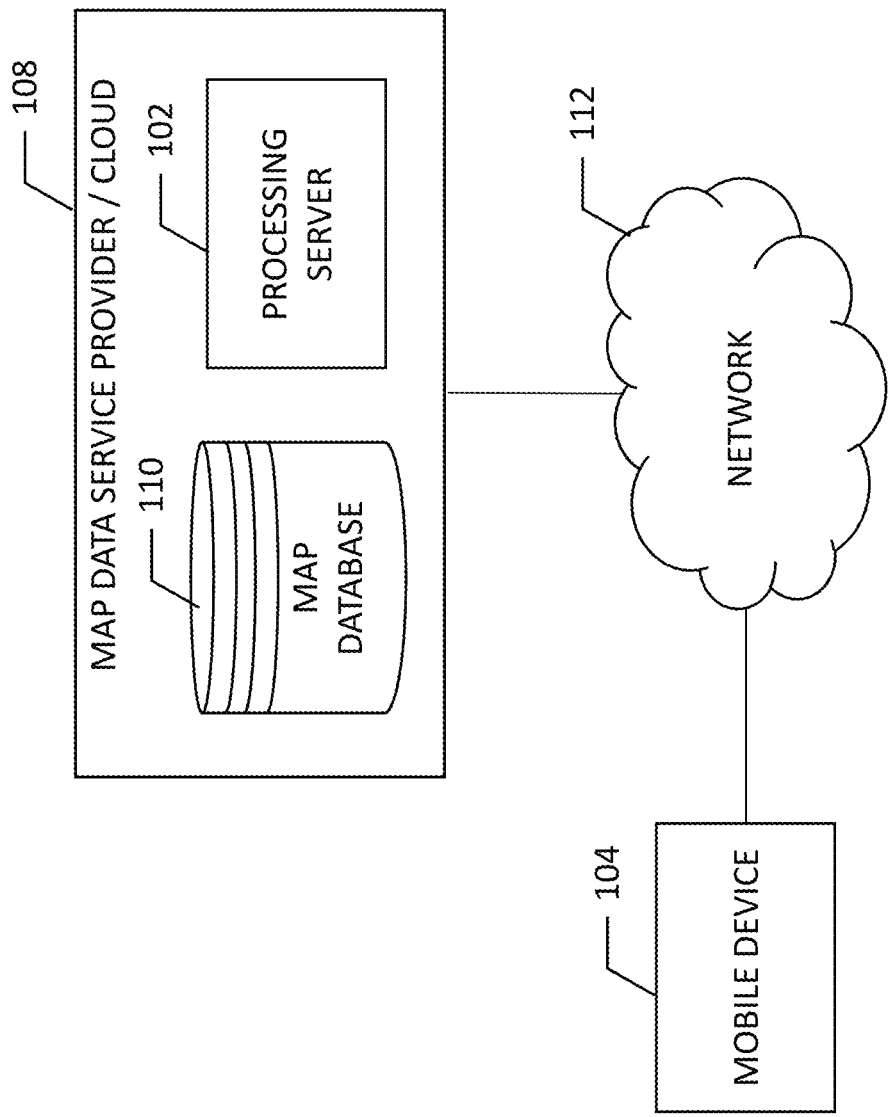
Figure 3:
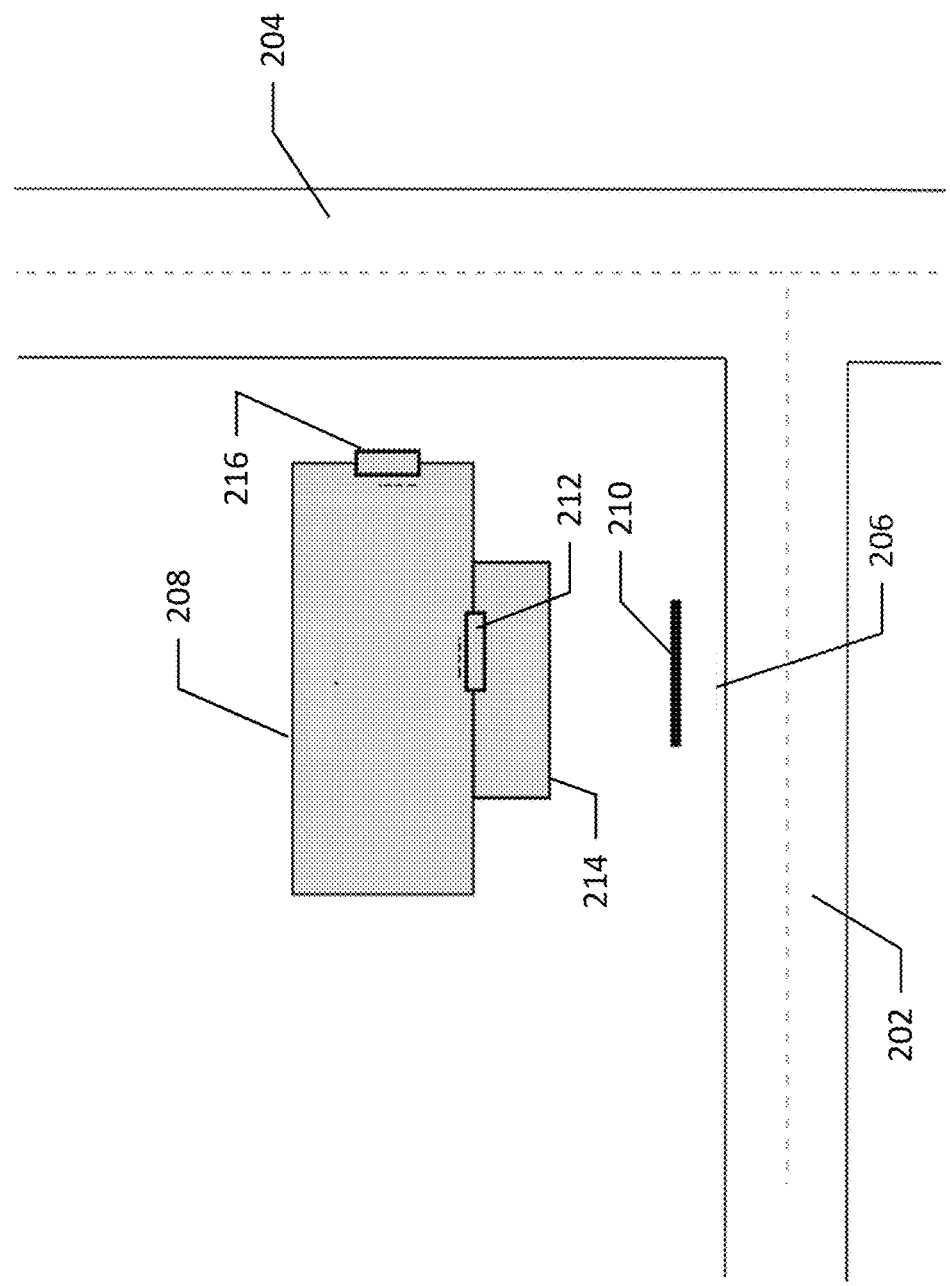
Figure 4:
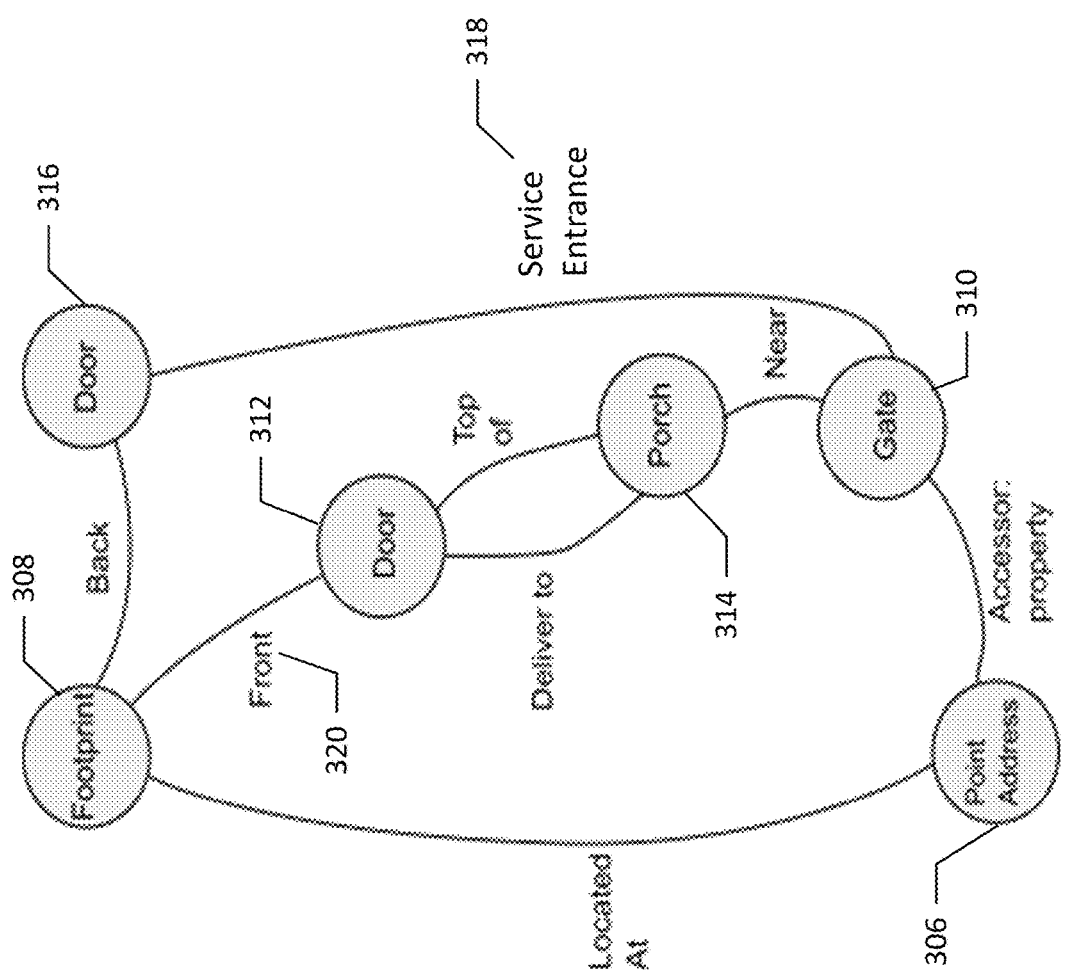
Figure 5:
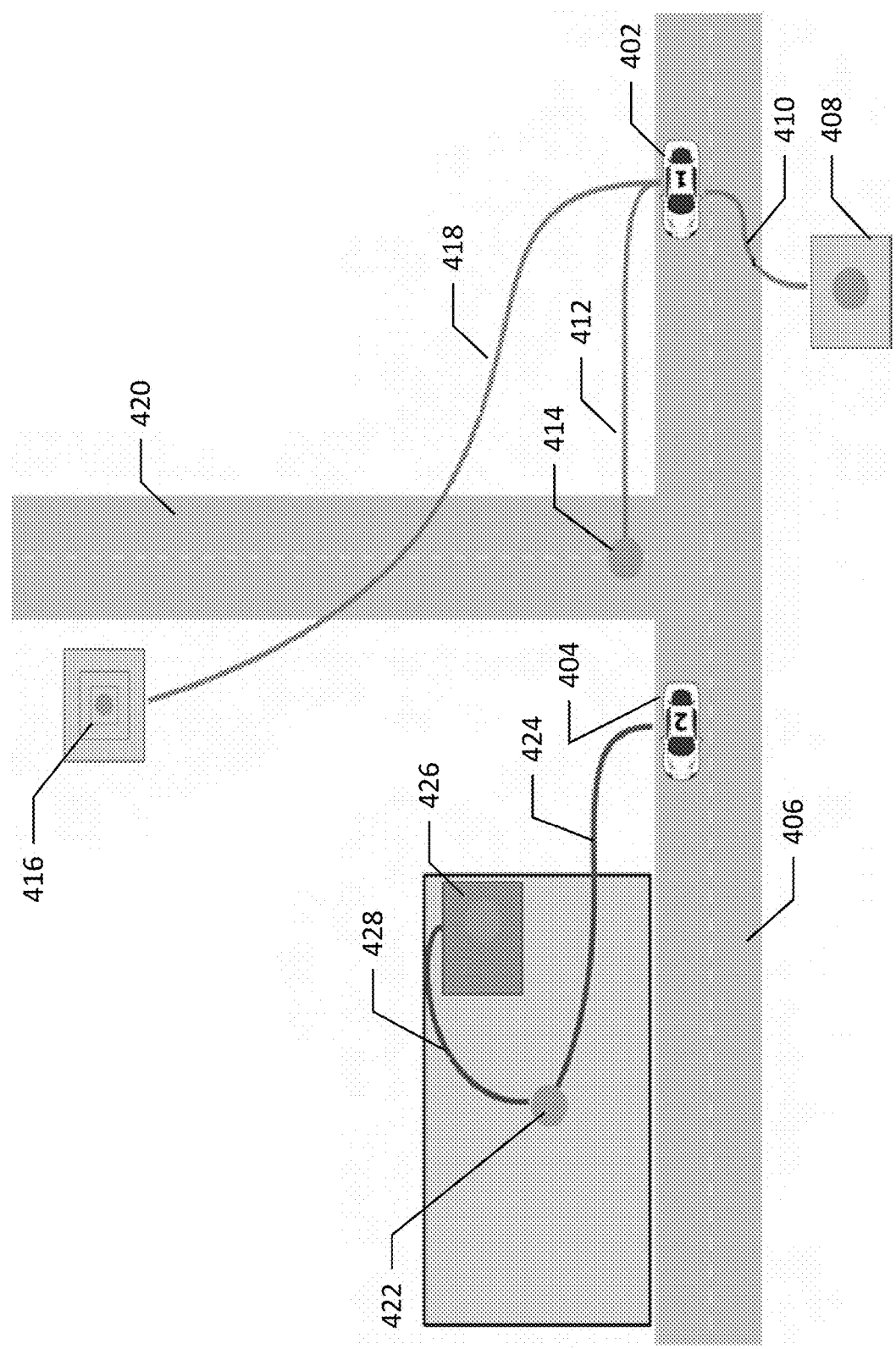
Figure 6:
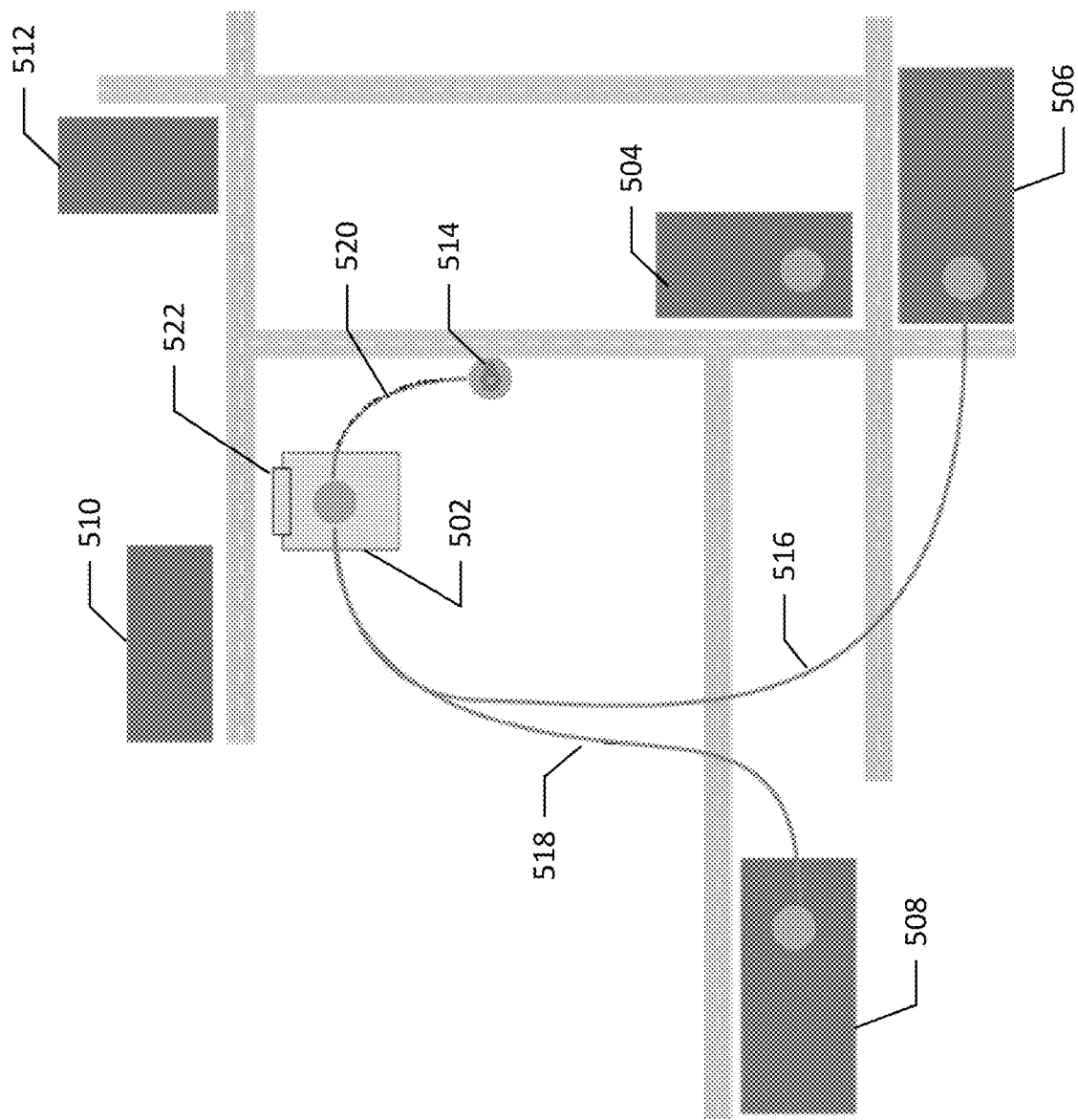
Figure 7:
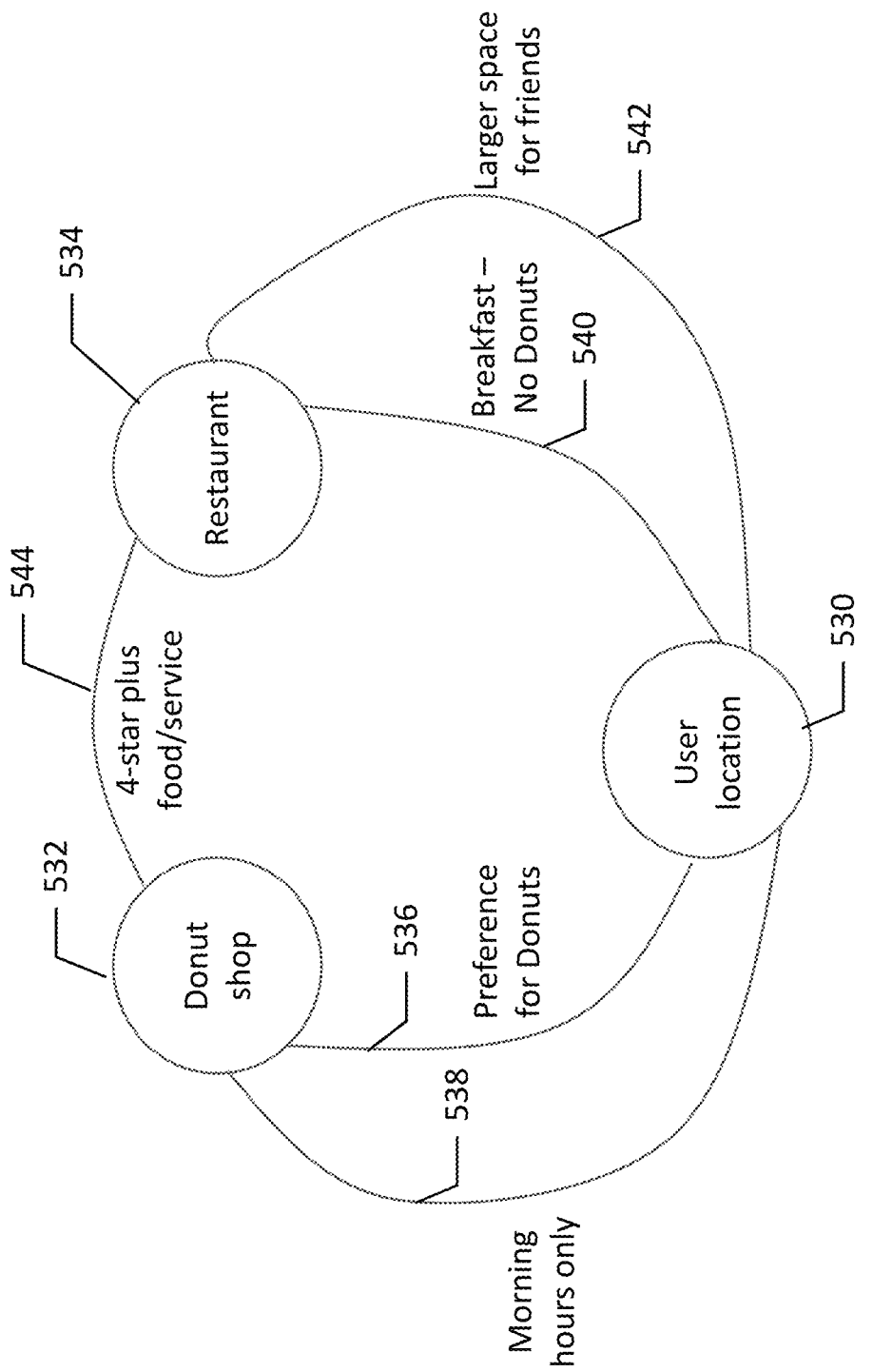
Figure 8:
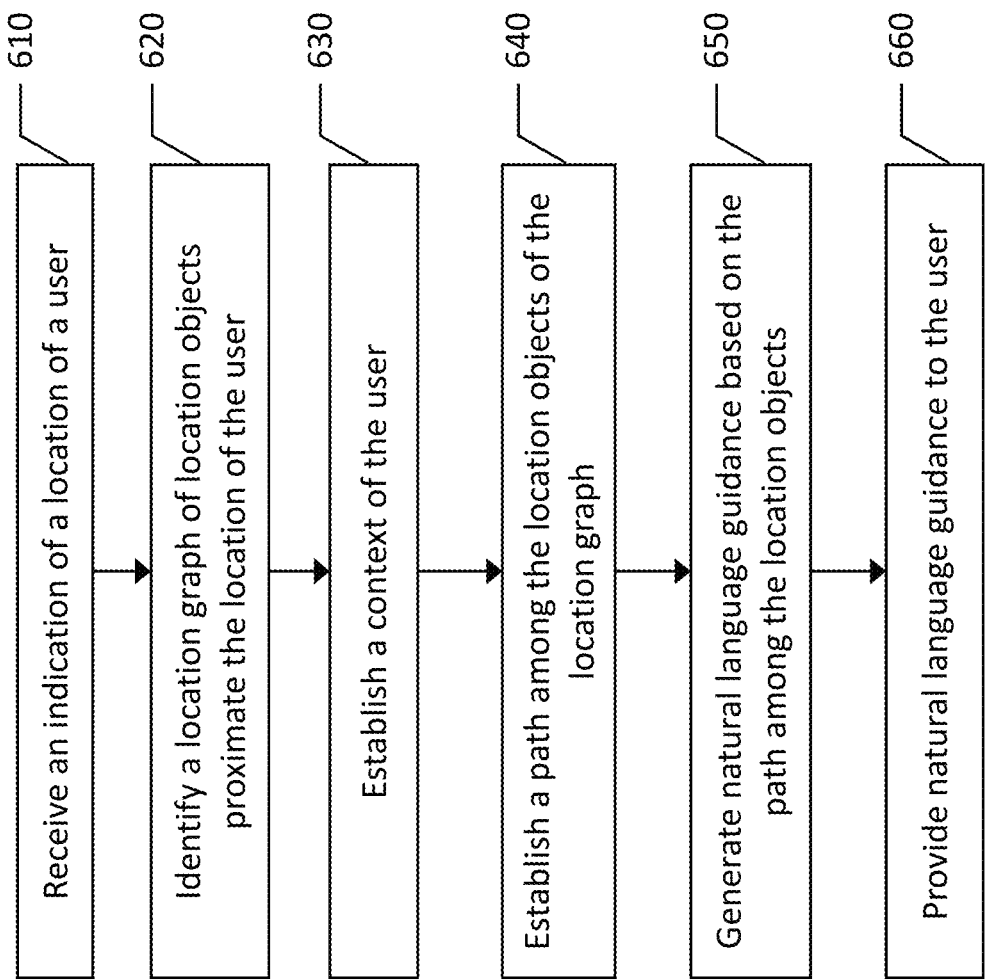

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system of implementing natural guidance using location graphs according to an example embodiment of the present disclosure;

FIG. 3 is a diagram of a residence including a plurality of location objects according to an example embodiment of the present disclosure;

FIG. 4 is a location graph of location object nodes corresponding to the location objects of the diagram of FIG. 3 according to an example embodiment of the present disclosure;

FIG. 5 is a map of an area including a plurality of location objects with semantic relationships illustrated between the location objects according to an example embodiment of the present disclosure;

FIG. 6 is another map of an area including a plurality of location objects with semantic relationships illustrated between the location objects according to an example embodiment of the present disclosure;

FIG. 7 is a simplified location graph according to an example embodiment of the present disclosure; and FIG. 8 is a flowchart of a method for providing natural guidance based on a location graph according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for providing natural guidance to a user to navigate to a destination, and/or to provide contextually relevant information to a user as they travel along a path.

Embodiments described herein improve the manner in which a guidance system may provide relevant and meaningful information to a user.

In order to provide natural guidance and navigational assistance in a contextually relevant manner to a user, an understanding of the relationships between location objects is necessary. These relationships may be spatial, temporal, or dynamic. Further, semantic descriptions such as "nearby", "across from", "inside", etc. can be used to describe spatial relationships between objects where a precise position is not known, while the relationships may be defined using a set of known relational types. Provided herein is a system, method, and apparatus to use location graphs to establish the relationships between location objects and to use these relationships in providing contextually relevant natural guidance to a user as they traverse an environment. These relationships may include attributes such as distances, weight, text descriptions, binary objects, or the like.

Natural guidance may include one or more voice navigation cues that are more easily understood than typical navigation instructions. Natural guidance may provide user-specific guidance to function more similarly to a human navigator, pointing out visual cues such as recognizable buildings or landmarks that may facilitate navigation by a user more intuitively than conventional navigation instructions that include guidance such as "turn in three hundred meters." Natural guidance may use natural language generation to provide these user-friendly, intuitive instructions to a user, while embodiments described herein provide the underlying information that natural language generation would rely upon to generate these instructions.

Beyond simulated voice instructions, embodiments provided herein may include an augmented reality (AR) interactive experience of a real-world environment. In such an augmented reality, objects that reside in the real world may be augmented by computer-generated perceptual information, which may be across multiple sensory modalities, including visual, auditory, haptic, somatosensory, and olfactory, for example. Natural guidance of embodiments described herein is thus not limited to voice guidance to a user in an environment, but may also provide natural guidance of augmented reality environments as described further below.

Conventionally, natural guidance may use information encoded through a variety of processes, both semi-automatic and through manual entry. Generally, the coverage area for natural guidance is limited to areas for which data has been collected by a data collection service dedicated to such endeavors. This limits the applicability of natural guidance generally to road networks that have a high volume of traffic such that the collected data reaches a larger audience. Additional non-text data cannot effectively be incorporated into non-verbal guidance instructions, such as augmented reality. Further, the instruction set of natural guidance provided in this manner is typically fixed and predefined such that it cannot be dynamically generated and adapted based on context of use.

Augmented reality requires complex information to be available to locate and render contextual information associated with real-world locations correctly. Using spatial indexing alone is prone to error as positions of both the user and the augmented reality system need to be more precise than is generally available in a variety of situations. The location graph of example embodiments described herein can relate objects to a location via semantic and therefore descriptive but possibly non-precise location. An augmented reality guidance system can use this semantic information to provide salient guidance information.

Embodiments provided herein use location graphs that model relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme which defines the structure of the data. The organization of the nodes and relationships may be stored in an ontology which defines a set of concepts where the focus is on the meaning and shared understanding. These descriptions permit mapping of concepts from one domain to another.

As described herein, embodiments of the claims may use location graphs to facilitate natural guidance based on contextual relationships among nodes of the location graph. Embodiments described herein may provide natural guidance for navigation, such as between an origin and a destination, whether a user is traveling by car, bicycle, public transit, on foot, or any other transportation type. Further, embodiments may provide natural guidance for a user as they traverse an environment. For example, the natural guidance of example embodiments may identify points of interest to a user as they traverse an environment based on a context of the user, context of the time of day/week/month, context of an event, etc.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, gyroscope, and/or camera. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, a microphone, physical buttons, and/or other input/output mechanisms. In an example embodiment, the processor 24 may comprise user interface circuitry configured to control at least some functions of one or more input/output mechanisms, such as receiving spoken dialog or reading spoken dialog to a user. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively support wired communication or also may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database includes node data records, road segment or link data records, point-of-interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, light detecting and ranging (LIDAR), ultrasonic and/or infrared sensors.

In example embodiments, a navigation system user interface may be provided to provide route guidance from an origin, along a route to a plurality of destinations or points-of-interest. Navigation systems may receive an indication of an origin, which may include a current location of a device on which the navigation system is operating (e.g., an in-vehicle navigation system or a mobile device, for example) or a separate location specified by the user, and an indication of a category of point-of-interest in which the user is interested in proximity to the location specified. In response to receiving the location and the point-of-interest category, a plurality of points-of-interest may be identified. Routes from the location to each of the plurality of points-of-interest may be calculated based upon available roadways, walkways, etc. These routes may be used, in an algorithm, for example, to generate one or more consolidated routes that encounter two or more of the points-of-interest. Said differently, two or more of the points-of-interest may be found along a consolidated route. The navigation system user interface may optionally include a speaker and microphone used to both provide spoken dialog instructions or information and to receive spoken dialog from a user.

A map service provider database may be used to provide route guidance to a navigation system and may be used to provide guidance to a user as they navigate an environment. FIG. 2 illustrates a communication diagram of an example embodiment of a system for implementing example embodiments described herein. The illustrated embodiment of FIG. 2 includes a mobile device 104, which may be, for example, the apparatus 20 of FIG. 1, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point-of-interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as points-of-interest. In one embodiment, the nodes and links can make up the base map and that base map can be associated with a high-definition (HD) layer including more detailed information, like lane level details for each road segment or link and how those lanes connect via intersections. Furthermore, another layer may also be provided, such as an HD live map, where road objects are provided in detail in regards to positioning, which can be used for localization. The HD layers can be arranged in a tile format.

The map database may include a database of points-of-interest and information associated with each point-of-interest. Information associated with each point-of-interest may include one or more categories for the point-of-interest, such as fueling stations, hotels, restaurants, museums, stadiums, offices, auto repair shops, buildings, stores, parks, etc. Information regarding each point-of-interest may further include sub-categories, such as restaurant type (e.g., pizza, Asian fusion, Italian, etc.). The database may also include or have access to attributes for various points-of-interest, such as a database of user-reviews, price point of services/products provided, hours of operation, popularity, etc. The map database 110 can include data about the POIs and their respective locations in the point-of-interest records. The map database 110 may include data about places, such as cities, towns, or other communities, and other geographic features such as bodies of water, mountain ranges, etc. Such place or feature data can be part of the point-of-interest data or can be associated with points-of-interest or point-of-interest data records (such as a data point used for displaying or representing a position of a city). In addition, the map database 110 can include event data (e.g., traffic incidents, construction activities, scheduled events, unscheduled events, etc.) associated with the point-of-interest data records or other records of the map database 110.

The map database may further include location graphs as described further below which include location object nodes and relationships defined among the nodes of the location graph. A location graph is a knowledge graph of nodes that are interrelated with relationships between the different nodes. In a location graph, the nodes are location objects. For example, a node may be a point-of-interest, such as a theater. Other nodes may include a first street, a second street, a parking lot, etc. Relationships may interconnect the nodes of the location graph, such as a relationship between the theater node and the first street may include a numerical address, where the numerical address is the relationship between the first street and the theater. A parking lot may be affiliated with the theater, and the relationship may be an indication of parking available for the theater. The relationship between the second street node and the theater may include an entrance to the parking lot, such that the second street node is connected to the theater node by way of the parking lot node.

While example embodiments may include location objects as nodes, nodes may take many forms, including an event, for example. An event may be a node that includes a time (date/time), location, event type (e.g., sporting event), etc. That node may be related to the physical location of the event, transportation nodes, or other elements that have a contextual relationship with the event. The relationships or connections amongst the nodes of a location graph may be contextual links, whereby the relationships relate to how a node is connected to another node. Example embodiments will be described further below. The location graph or multiple location graphs may be stored in the map database 110 of map services provider 108 and be accessible to users of the service according to example embodiments described herein.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. These map geometries may optionally include three-dimensional map information that provides building footprint information, building profile/façade information, point-of-interest shape and size, etc. This three-dimensional information may be used to generate real-world representations of points-of-interest in a mapped environment.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. Other formats including tile structures for different map layers may be used for different delivery techniques. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an in-vehicle navigation system, such as in a vehicle's head unit, infotainment unit, or an ADAS (advanced driver assistance system), a personal navigation device (PND), a portable navigation device, a cellular telephone, a smart phone, a personal digital assistant (PDA), a watch, a camera, a computer, augmented reality headset, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

Example embodiments provided herein provide enhanced capabilities related to guidance for both augmented reality and non-augmented reality use cases. Embodiments provide an ability to relate entities which do not have precise locations and provide guidance relative to these entities. Embodiments further use the ontologies of the location graphs described herein to extract natural descriptions of locations using the graph data and ontology to provide contextually relevant guidance to a user in an environment.

While natural guidance has been employed before, the conventional implementation creates geo-fences around certain areas where a user entering within a defined geo-fence will trigger the presentation of information related to the subject of the geo-fence. This information is conventionally static and cannot be adjusted to reflect a current context or adapted to a particular user. Using an ontology of the location graphs described herein enables contextual instructions to be inferred from the graph. Further, example embodiments described herein provide the capability to create relationships between a location and a type of data, such as audio, images, three-dimensional meshes, icons, etc.

Location graphs, as described herein, can use defined relationships between location objects to provide hyper-local information about a location. As an example, a package may need to be delivered to a house. The traditional view of the delivery location may include where only a street, point address is available, and possibly the footprint of the building. While this level of information is sufficient to navigate via the road network to the address, there is insufficient information to enable augmented reality or other types of guidance to navigate to a final delivery location if specified.

Using a location graph, additional information can be related to the address or the footprint to guide the final delivery location. In the instant embodiment, instructions on delivery may be provided by the customer. Further information can then be provided by previous delivery drivers. This hyper-local information can originate from any number of sources including sensor data, text, imagery combined with various machine learning models, or the like. Location graph generators may collect this information and model the information as a location graph of named and parameterized relationships.

FIG. 3 illustrates an example embodiment of a residence at the corner of a first street 202 and a second street 204. While a conventional navigation system may provide routing instructions to get to the street address 206, embodiments described herein may use a location graph to further define the residence and features thereof, which may facilitate package delivery, service calls, or the like. As shown, the residence may include a footprint 208 of the building, a gate 210 to access a front walk, a porch 214, a front door 212, and a side door 216. Each of these location objects may be nodes of a location graph and their relationships relative to one another may be identified and stored as part of the location graph.

FIG. 4 illustrates the location graph corresponding to the residence of FIG. 3. As shown, the nodes include the features of the residence identified in FIG. 3, with the relationships identified between each node. This information is attached not only using one-to-one relationships, but a chain of relationships. The use of an ontology permits inferencing of additional information from the semantic information present. The semantic information may indicate that the door 312 relative to footprint 308 is at the front 320 of the residence, while the footprint 308 is located at the point address 306. The door 316 is at the back of the footprint 308 and is related to the property as a service entrance 318 as identified by the relationship drawn between the gate access 310 and the door 316. Beyond this semantic information, inferred information may include information such as the concept of a porch node 314 is likely at the top of a set of stairs given the nature of a "porch" of a home. In this manner, additional natural guidance may be provided to someone approaching the residence to deliver a package, such as an instruction to set the package on the porch at the top of the stairs. The gate 310 may require that a user must pass through the gate to access the property. This requires that the ontology is modeled in a formal knowledge representation language which supports inferencing and is readily available from both open-source and proprietary tools.

The location graph of example embodiments provided herein may provide the ability to bind information to real-world objects. For example, in the delivery use case of delivering a package to the residence of FIG. 3, a gate access code may be bound to the gate, while the front door is identified as the delivery point for packages. Further, service technicians such as plumbers, electricians, etc., may be guided, based on contextual cues, to the side/rear door 316 as a service entrance shown by relationship 318. The location graph described herein may be used by any user of the map services provider, while the map services provider may understand a context for which the location graph is used, and therefore provide appropriate natural guidance accordingly. For example, in the aforementioned example, a delivery driver may be using the location graph in the context of delivering packages to predetermined addresses, such that delivery locations are readily identified for the driver automatically based on a package destination address. Similarly, a service technician may use a device of example embodiments where the context is understood to be that of a service technician, such that the service technician is guided to the service entrance.

Additional information may be added to the location graph by users to further enhance the detail and information level provided by the natural guidance. For example, a service technician may visit a building for the first time, and may identify where a circuit breaker panel is within the building. This location may be added to the location map as a new location node, or bound to an existing location node if that location node corresponds to the location of the circuit breaker panel. In this manner, a subsequent service visit, whether or not it is from the same service technician, may be guided to the circuit breaker panel through natural guidance efficiently and effectively.

While the context of a user may be established as described above as a delivery driver or service technician, those same users may have different associated contexts when they are not working. As such, a delivery driver may have the context of a delivery driver while they are working between certain hours, and that context may change to a parent driving a carpool at different hours of the day or different days of the week depending upon the person's schedule. As such, contexts may include a variety of information relating to a person, their schedule, the time of day, day of week, season of year, weather, special events, etc. Embodiments described herein may recognize contexts through data input, whether that data input is a time/date input, weather input, schedule (e.g., personal calendar) input, user selection, etc. This understanding of context may substantially improve the natural guidance provided by embodiments described herein. Further contexts may be learned, where the context of a user may be learned as a profile of that person, such as personal preferences for types of restaurants, preferences for avoiding highways, preferences for fastest route versus shortest route, etc.

The location graph described herein may include relationships of various kinds between nodes of the location maps, and may use different relationships based on a context of the user. As described above, depending on who is arriving at the residence of FIG. 3, different instructions may be provided to the user as to guide them where to enter the residence. Thus, the location graph is a series of interconnected nodes that are traversed according to the context of a user.

Embodiments may create natural language guidance by combining a location graph and its ontology. This may be performed, in part, through Natural Language Generation (NLG) algorithms that can produce natural instructions from a digital representation of data. These algorithms may translate graph-based representations into natural languages. Optionally, templates may be used which generate different styles of natural language instructions depending on the use case, context, or problem domain.

A location graph combined with a graph-based natural language generation system can create guidance instructions dynamically and can be dependent upon external factors including context such as time of day, friend visiting versus a service call, or even mode of approach (e.g., on foot or by car). The flexibility of example embodiments to model relationships as described herein extends this flexibility to the natural guidance.

An example embodiment of the present disclosure is described herein for providing natural guidance using location graphs. According to the example embodiment, a user may specify a desired destination for a map services provider 108 to generate a route from the user's current location or origin. Once the user approaches the destination or address, the point address identification is used to retrieve a sub-graph relevant to delivery. The location object nodes of the subgraph are traversed searching for routes from the point address to the final node. The path selected may not be the shortest path to the final node as the location graph may specify other paths that are more appropriate given the context. Given the subgraph and optionally a domain template (e.g., house delivery), any additional relevant information is inferred using a logical inferencing engine which adds additional nodes to the subgraph. In the example embodiment of FIG. 3, the gate means an accessor to the property while the porch typically means stairs. The location graph with the selected path among the nodes may be used as an input to the natural language generation system to generate a text description of the delivery path from the street to the door, such as "from the street, enter through the gate using code 1234. At the top of the porch stairs, please deliver to the front door.

According to an example embodiment in which augmented reality is implemented, an additional operation is added to translate an instruction, which may be in a natural language from natural language generation, into visual cues or using augmented reality information bound to the location object nodes. Further, for augmented reality, the nodes can be used to provide a list of expected objects to detect during each step of the guidance. For example, the expected objects in the use case of FIGS. 3 and 4 include a gate 210/310, a porch 214/314, stairs (inferred from the "porch"), and a front door 212/312, among others. Any image recognition algorithm either on a device 104 or through service provider (e.g., map services provider 108) has an expected set of objects to detect. Further, as any additional data can be related to any other information, special instructions, icons, three-dimensional objects, notifications, etc. can be bound to an object and activated when detected. For example, since the gate access code is bound to the gate location object node, the gate access code could be presented in the augmented reality system upon approaching the gate.

Augmented reality or AR may provide a view of an environment including features that are digitally superimposed over an image of the environment. The features that are superimposed may provide information about one or more features of the environment, may provide a location indicator of an element of interest in the environment, or may provide features in the environment for entertainment value, for example. According to example embodiments described herein, augmented reality can be used to provide information to a user regarding an environment using the location objects of the location graph, identifiers of the location objects, and/or semantic relationship information. For example, a user approaching the gate 310 of a residence may view the gate through a device, such as a mobile phone, augmented reality glasses, a windshield of a vehicle that includes a capability of displaying information on the display, such as using a heads-up display projection. Upon approaching the gate 310, the gate access code may be presented in the augmented reality system proximate the gate or proximate a keypad into which the gate access code must be entered. Such augmented reality may provide an easily understood interface to facilitate navigation of a property without being obtrusive or requiring user input for the user to receive the information. Similarly, augmented reality may be used to direct a user to a specific entrance of a building, such as the door 316 which may not be visible from the point address 306. In such an embodiment, the augmented reality may provide an indicator of the location of a door 316 and identify that door as the service entrance 318 to guide a user who is to enter through the service entrance.

According to another example embodiment, other guidance can be inferred by traversing connections between location objects which are not spatially related or where the spatial relationship is not easily defined or indexable. Since various non-spatial relationships can be bound to specific locations through a set of relations, guidance information can be specialized to locations that cannot be modeled spatially or where a spatial search would return incorrect information or very general information.

FIG. 5 illustrates an example embodiment of natural guidance provided to a user as they traverse an environment. A subgraph relevant to the user's context may be used and updated as a user travels from a first location 402 to a second location 404 as the user travels along roadway 406. As shown, the location object nodes include a building 408, a road/intersection 414, a building 416 along road 420, and another building 422. As the user travels from position 402, a relationship in the location graph may indicate that the building 408, which may be a specific type of store such as a coffee shop, is on the left based on link 410. This may be communicated to a user via natural guidance in the form of "you are now passing a coffee shop on your left", for example. The user may also be alerted to location object node 414 of an intersection with another roadway 420. The user may be informed that they are approaching this roadway through natural language such as "approaching an intersection with Main Street", whether a user is to turn at that intersection or not, based on link 412. The user may be informed of the presence of building 416 based on link 418, where the user may be informed that "office building located on Main Street will be visible on the right." In this manner, the user may be guided through the environment with natural guidance that is familiar to a user and easily understood.

Further, according to the embodiment of FIG. 5, the user may be informed that they are coming upon another building 422 as they approach position 404 based on link 424. While the user may not be able to see store 426 within building 422, based on the link 428 of store 426, the user may be informed that store 426 is present within building 422, if the context of the user suggests that this information would be welcomed by the user. In this example, the location graph can leverage static and dynamic entities relevant to the context of the driver or user. Unlike a spatial based corridor search, the location graph can search multiple edges or links to provide guidance using relationships which are descriptive and dynamic based on the context. The location graph may be a subgraph extracted from the location graph using the route information which is then used to infer relationships relevant to the driver context. In the illustrated embodiment of FIG. 5, the guidance is updated dynamically as the car travels from the first location 402 to the second location 404.

According to another example embodiment of the present disclosure, a restaurant of interest may be located in a congested downtown area, as illustrated in FIG. 6. According to the illustrated embodiment, there are five parking locations 504, 506, 508, 510, and 512, proximate the restaurant 502. There is also valet parking at location object node 514. The valet parking 514 is located around the corner from the main entrance 522, as indicated by relationship link 520 connecting the restaurant node 502 to the valet parking node 514. Two of the parking lots may provide parking at a reduced cost to the restaurant patrons; however, they are not the closest parking lots to the restaurant 502. These parking lots, 508 and 506, are related to the restaurant 502 by links 518 and 516, respectively, where the relationship links may indicate the affiliation with the restaurant and the reduced parking rate. Using a conventional spatial search, the closest lots 510, 512, and 504, would be identified as the preferred parking locations. However, using the location graph as defined herein provides additional characterization of location objects through their links.

Spatial guidance alone would not be capable of discerning the relationships among location object nodes as with the parking lots of FIG. 6, such that the guidance of spatial guidance would be less than ideal. The location graph described herein can model spatial and non-spatial relationships. The valet location can be modeled by the non-spatial relationship of "around the corner" indicated by relationship link 520, while the "reduced parking" relationship of parking lots 506 and 508 can be indicated by relationship links 516 and 518, respectively. As these relationships are semantic descriptions, the aforementioned process using this information to provide improved natural guidance to the correct parking lots or valet drop off can be performed without a specific location. The relationship of "around the corner" is salient enough to convey its location to provide natural guidance to a user. In the case of the parking lots, the lots may be spatially located far enough away from the restaurant that a spatial lookup would miss or omit these lots.

The semantic relationships may or may not be location centric. For example, the semantic relationships can be a relation of type, preference, value, or any type that correlates one location object with another. For example, the door 316 of FIG. 4 is an entrance that is identified through a semantic relationship as a service entrance 318. Further, as the relationships can vary based on context, the preferences of a user may define relationships appropriate for that user. For example, a user may prefer open parking lots to parking garages or structures, which may be due to a vehicle's size. In an example similar to that of FIG. 6, the location objects of parking lots that are open parking lots may be identified for the user, while parking structures may be omitted. Similarly, referring again to the embodiment of FIG. 6, parking structures 508 and 506 having relationships 516 and 518 (e.g., contractual relationships or reciprocity) with a destination 502 (e.g., a restaurant or hotel) may be identified through that relationship, while other parking structures which may be closer 512 and 510 may not be identified for a user, or may be identified with a qualifier indicating that the relationship to the destination does not include any parking rate reduction.

An example algorithm for using the location graphs as described herein to provide natural guidance may include an initial extraction of the subgraph of the location graph that is relevant to a user. That subgraph may be established based on a route established between an origin and a destination, the subgraph may be established as within a predefined radius of the user, or the subgraph may be established based on historical data of the most common/relevant regions of a geographical area. The subgraph extracted from a location graph based on a route may extract a subgraph for all road segments along the route, and all relevant nodes up to a predefined limit on the number of nodes away from the road segment. For example, nodes could interconnect through relationships to a large degree, such that a predetermined number of degrees of separation from the original node along the route may be established to limit bandwidth and processing requirements. Using the established subgraph, based on the current location, speed, heading, or other context-based information, new relationships are inferred to build a context aware subgraph dynamically. The current position may be map-matched to a road segment, and relevant landmarks can be inferred by looking at relationships up to a predefined degree of separation. Spatial relationships can be inferred from heading and position, and updated at a fixed cadence of time, distance, or a combination thereof. Using a natural language generation system, the subgraph can be used to provide natural guidance to a user in a contextually aware manner that is both useful and informative to a user.

The location graph flexibility to model both spatial and no-spatial relationships along with ontologies and the graph-based natural language algorithms allow for more flexible, intuitive, and context-specific guidance instruction than what is presently available. Further, embodiments described herein enable custom guidance cues in text, audio, icons, etc. to be related to objects and relationships which can all be used to facilitate natural guidance. Fuzzy or general spatial relations can be modeled which do not require precise locations to be related to real-world locations, a technique that is distinct from conventional guidance techniques which rely on deterministic locations.

As described above, the path among location objects within a location graph is a sequence of location nodes and semantic relationships that is established based on a context of a user and a location. As the path is contextually aware, the path identified within a location graph may be different for two different users at the same location, or even different for the same user at two different times of day or based on the difference between any elements of context. For example, a path through a location graph may be established for a first user that has a preference for donuts such that the established path through the location graph identifies a donut shop and provides an indication of a route to the donut shop via natural guidance. Conversely, another user at the same location may have a preference for a table-service breakfast restaurant, such that the path established through the same location graph may be different and may identify a sit-down restaurant for that user, providing natural guidance to the sit-down restaurant. These two different paths through the same location graph may be established based on the user and the context thereof, using semantic relationships between location objects that are relevant to the user and context of the user. Further, the user that prefers donuts may be in the same location from which they were directed to a donut shop at a different time of day (e.g., late afternoon) such that the context of the user is different, and they may not be directed to the donut shop even through the same location graph.

FIG. 7 illustrates an example embodiment of a user at a location 530 where the location graph for that location includes a donut shop 532 and a restaurant 534. The semantic relationships identified include the user's preference for donuts 536 which relates the user (at user location 530) to the donut shop 532. Further, the semantic relationship of "morning hours only" 538 may be present in the location graph during a relevant context, such as during morning hours. The "morning hours only" 538 semantic relationship may not be present if the user is at user location 530 outside of morning hours. Also shown is a relationship between the donut shop 532 and the restaurant 534 that both establishments have 4-star and above food and service ratings (e.g., from a crowd-sourced review service). This commonality relates the donut shop and restaurant through a semantic relationship. The semantic relationship shown at 540 may indicate that the restaurant has a breakfast menu (given that the context is morning hours), but no donuts. Semantic relationship 542 illustrates that the restaurant has a larger space which is beneficial for meeting up with friends, such that if the user's context includes meeting up with friends, the semantic relationship 542 may suggest a preference for the restaurant. With an understanding of the user's context, embodiments described herein may provide natural guidance to a user among a path through the location graph to a destination.

FIG. 8 is a flowchart illustrative of a method according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 8 illustrates a method for providing natural language guidance to a user based on a location and a location graph associated with the location. An indication of the location of the user is received at 610, which may be established based on sensors, such as sensor 21 of apparatus 20 of FIG. 1, which may include a global positioning sensor. A location graph of location objects proximate the location of the user is established at 620, where the proximity may be established based on a predefined distance of the location of the user, or within a predefined distance and/or a predefined degree of relationship (e.g., within two semantic relationships of a location object within the predefined distance). A context of the user is established at 630. The context may include information that is user independent, such as time, day, season, weather, etc., and may also include information that is user dependent, such as personal preferences and/or the user's purpose for being at the location, such as visiting friends, delivering packages, providing a service call, etc. A path among the location objects of the location graph is established at 640 which may be based, at least in part, on the established context of the user. The path among the location objects may be any combination or sequence of location objects and semantic relationships within the location graph. Based on the path among the location objects, natural language guidance is generated at 650 and natural language guidance is provided to the user at 660.

In an example embodiment, an apparatus for performing the method of FIG. 8 above may comprise a processor (e.g., the processor 24) configured to perform some or each of the operations (610-660) described above. The processor may, for example, be configured to perform the operations (610-660) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-660 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive an indication of a location of a user;
   identify a location graph of location objects proximate the location of the user, including a physical location and semantic relationships among the location objects;
   establish a context of the user;
   establish a path among a sequence of a subset of the location objects of the location graph based, at least in part, on the context of the user, wherein the path comprises semantic relationships between location objects of the sequence of the subset of the location objects;
   generate natural language guidance based on the path among the sequence of the subset of the location objects including the semantic relationships among the location objects; and
   provide natural language guidance to the user for the path among the sequence of the subset of the location objects.

2. The apparatus of claim 1, wherein the location of a user comprises a location along a route between an origin and a destination, and wherein causing the apparatus to identify a location graph of location objects comprises causing the apparatus to:
   identify a location graph of location objects proximate the route between the origin and the destination.

3. The apparatus of claim 2, wherein causing the apparatus to identify a location graph of location objects proximate the route between the origin and the destination comprises causing the apparatus to identify a location graph of location objects within a predefined distance of the route, and within a predefined degree of separation on the location graph of location objects within the predefined distance of the route.

4. The apparatus of claim 1, wherein causing the apparatus to establish the path among the sequence of the subset of the location objects of the location graph comprises causing the apparatus to:
   identify location object nodes relevant to the context of the user;
   analyze the semantic relationships among the location object nodes of the location graph;
   identify semantic relationships among the location object nodes relevant to the context of the user; and
   establish a path of semantic relationships relevant to the context of the user among the location object nodes relevant to the context of the user.

5. The apparatus of claim 4, wherein the apparatus is further caused to:
   infer additional location object nodes based on the identified location object nodes based on a type of location object node.

6. The apparatus of claim 1, wherein the apparatus is further caused to:
   generate visual cues based on the path among the location objects; and
   provide for augmented reality of an environment of the location of the user including the visual cues.

7. The apparatus of claim 1, wherein the semantic relationships between location objects are dependent upon a context of the user.

8. A computer program product comprising at least one non-transitory computer-readable storage medium having computer-executable program code instructions stored therein, the computer-executable program code instructions comprising program code instructions to:
   receive an indication of a location of a user;
   identify a location graph of location objects proximate the location of the user, including a physical location and semantic relationships among the location objects;
   establish a context of the user;
   establish a path among a sequence of a subset of the location objects of the location graph based, at least in part, on the context of the user, wherein the path comprises semantic relationships between location objects of the sequence of the subset of the location objects;
   generate natural language guidance based on the path among the sequence of the subset of the location objects including the semantic relationships among the location objects; and
   provide natural language guidance to the user for the path among the sequence of the subset of the location objects.

9. The computer program product of claim 8, wherein the location of a user comprises a location along a route between an origin and a destination, and wherein the program code instructions to identify a location graph of location objects comprise program code instructions to:
   identify a location graph of location objects proximate the route between the origin and the destination.

10. The computer program product of claim 9, wherein the program code instructions to identify a location graph of location objects proximate the route between the origin and the destination comprise program code instructions to identify a location graph of location objects within a predefined distance of the route, and within a predefined degree of separation on the location graph of location objects within the predefined distance of the route.

11. The computer program product of claim 8, wherein the program code instructions to establish the path among the sequence of the subset of the location objects of the location graph comprise program code instructions to:
   identify location object nodes relevant to the context of the user;
   analyze the semantic relationships among the location object nodes of the location graph;
   identify semantic relationships among the location object nodes relevant to the context of the user; and
   establish a path of semantic relationships relevant to the context of the user among the location object nodes relevant to the context of the user.

12. The computer program product of claim 11, further comprising program code instructions to:
   infer additional location object nodes based on the identified location object nodes based on a type of location object node.

13. The computer program product of claim 8, further comprising program code instructions to:
   generate visual cues based on the path among the location objects; and
   provide for augmented reality of an environment of the location of the user including the visual cues.

14. The computer program product of claim 8, wherein the semantic relationships between location objects are dependent upon a context of the user.

15. A method comprising:
   receiving an indication of a location of a user;
   identifying a location graph of location objects proximate the location of the user, including a physical location and semantic relationships among the location objects;
   establishing a context of the user;
   establishing a path among a sequence of a subset of the location objects of the location graph based, at least in part, on the context of the user, wherein the path comprises semantic relationships between location objects of the sequence of the subset of the location objects;
   generating natural language guidance based on the path among the sequence of the subset of the location objects including the semantic relationships among the location objects; and
   providing natural language guidance to the user for the path among the sequence of the subset of the location objects.

16. The method of claim 15, wherein the location of a user comprises a location along a route between an origin and a destination, and wherein identifying a location graph of location objects comprises:
   identifying a location graph of location objects proximate the route between the origin and the destination.

17. The method of claim 16, wherein identifying a location graph of location objects proximate the route between the origin and the destination comprises identifying a location graph of location objects within a predefined distance of the route, and within a predefined degree of separation on the location graph of location objects within the predefined distance of the route.

18. The method of claim 15, wherein establishing the path among the sequence of the subset of the location objects of the location graph comprises:
   identifying location object nodes relevant to the context of the user;
   analyzing the semantic relationships among the location object nodes of the location graph;
   identifying semantic relationships among the location object nodes relevant to the context of the user; and
   establishing a path of semantic relationships relevant to the context of the user among the location object nodes relevant to the context of the user.

19. The method of claim 15, further comprising:
   generating visual cues based on the path among the location objects; and
   providing for augmented reality of an environment of the location of the user including the visual cues.

20. The method of claim 15, wherein the semantic relationships between location objects are dependent upon a context of the user.

* * * * *